(12) United States Patent
Kamdar et al.

(10) Patent No.: US 9,014,036 B2
(45) Date of Patent: Apr. 21, 2015

(54) DYNAMIC BAND SELECTION AND AGGREGATION

(71) Applicant: Verizon Patent and Licensing Inc., Basking Ridge, NJ (US)

(72) Inventors: Kamlesh S. Kamdar, Dublin, CA (US); Lalit R. Kotecha, San Ramon, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 169 days.

(21) Appl. No.: 13/655,758

(22) Filed: Oct. 19, 2012

(65) Prior Publication Data

US 2014/0112160 A1    Apr. 24, 2014

(51) Int. Cl.
*H04W 72/02* (2009.01)
*H04W 36/06* (2009.01)
*H04W 36/32* (2009.01)
*H04W 72/04* (2009.01)

(52) U.S. Cl.
CPC .............. *H04W 72/02* (2013.01); *H04W 36/06* (2013.01); *H04W 36/32* (2013.01); *H04W 72/0453* (2013.01)

(58) Field of Classification Search
CPC ..... H04W 72/02; H04W 72/00; H04W 72/04; H04W 24/02; H04W 84/12; H04L 12/26; H04L 27/00; G06F 15/16; H04M 11/04
USPC ......... 370/252, 230, 312, 235–242, 253, 259, 370/316, 328–338, 352, 390; 455/404.1, 455/509, 424, 436, 450, 552.1, 73, 87, 41.2, 455/406, 418, 419, 423, 425, 433, 62; 709/227–245, 204, 212, 213, 222, 224, 709/226; 375/135, 219, 259–265; 380/34
See application file for complete search history.

(56) References Cited

U.S. PATENT DOCUMENTS

| | | | |
|---|---|---|---|
| 2010/0316004 A1* | 12/2010 | Macias et al. ................. | 370/329 |
| 2011/0300888 A1* | 12/2011 | Sakumoto ..................... | 455/509 |
| 2012/0122448 A1* | 5/2012 | Mueck et al. ................. | 455/424 |
| 2012/0300759 A1* | 11/2012 | Patanapongpibul et al. . | 370/338 |
| 2013/0028128 A1* | 1/2013 | Novak et al. ................. | 370/252 |
| 2013/0029606 A1* | 1/2013 | Wang et al. .................... | 455/62 |

* cited by examiner

*Primary Examiner* — Bob Phunkulh
*Assistant Examiner* — Wali Butt

(57) ABSTRACT

A user device may receive a selection of an application associated with the user device; generate a query based on receiving the selection of the application; provide the query to a first server; and receive, from the first server, a response to the query based on providing the query. The response may include information regarding a resource demand of the application and information regarding a performance of one or more wireless bands. The user device may also determine one or more first wireless bands, of the one or more wireless bands, that satisfy the resource demand; connect with a network via the one or more first wireless bands of the one or more wireless bands; and communicate with a second server using the network to operate the application in accordance with the resource demand.

20 Claims, 7 Drawing Sheets

| Application Information | | Resource Demand | | |
|---|---|---|---|---|
| Application ID | Application Name | Bandwidth | Latency | Jitter |
| 123 | Streaming video player | >5 mbps | <200 ms | <50 ms |
| 456 | Streaming music player | >500 kbps | <200 ms | <50 ms |
| 789 | Board game | >100 kbps | <150 ms | <50 ms |
| 912 | Action game | >300 kbps | <30 ms | <10 ms |

401 — Application Information
402 — Resource Demand

| Network ID | Coverage Area | Radio type | Wireless Band | Band Performance | | |
|---|---|---|---|---|---|---|
| | | | | Bandwidth | Latency | Jitter |
| 4521 | 100 ft, 37.8, -122.4 | WiFi | 2.4 GHz ISM | 30 mbps | 200 ms | 50 ms |
| | | | 5.0 GHz U-NII | 100 mbps | 100 ms | 25 ms |
| 8745 | 2 mi, 37.2, -120.2 | 4G | UMTS | 10 mbps | 300 ms | 75 ms |
| | | | Band 1 | 15 mbps | 200 ms | 70 ms |
| 4532 | 5 mi, 37.3, -121.6 | 3G | AWS | 300 kbps | 450 ms | 80 ms |
| | | | Band X | 200 kbps | 250 ms | 50 ms |

411 — Network ID
412 — Coverage Area
413 — Radio type
414 — Wireless Band
415 — Band Performance

DYNAMIC BAND SELECTION AND AGGREGATION

BACKGROUND

Users sometimes use user devices, such as mobile phones, laptops, tablet devices, etc., to perform some task (e.g., browse the web, send or receive e-mails, view videos, view photos, etc.) via a wireless network. The wireless network may sometimes have insufficient network capacity to perform the task, thereby increasing lag and/or processing times associated with performing the task.

BRIEF DESCRIPTION OF THE DRAWINGS

FIGS. 4A-4B illustrates example data structure that may be stored by one or more devices in the environment of FIG. 2;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may determine a wireless band via which a user device may connect to a network (e.g., a cellular network, a wireless fidelity (WiFi) network, and/or some other network). In some implementations, the wireless band may be determined based on a resource demand to support a particular application selected by a user of the user device (e.g., an application relating to video streaming, audio streaming, web browsing, and/or some other user device application) and based on the ability of the wireless band, and/or the associated network, to satisfy the resource demand. Additionally, or alternatively, the wireless band may be determined based on a geographic coverage area of an associated network and a geographic location of the user device with respect to the geographic coverage area. In some implementations, the systems and/or methods may cause the user device to dynamically switch wireless bands when a network, associated with the wireless band, becomes congested and/or when the wireless band does not satisfy the resource demand of the application.

In some implementations, the user device may connect to the network via a single wireless band having performance capability to support an application of the user device (e.g., satisfy a resource demand of the application). Alternatively, the user device may connect via multiple wireless bands (e.g., band aggregation) that, when used together, have the performance capability to support the application and satisfy the resource demand of the application.

Figure 1:
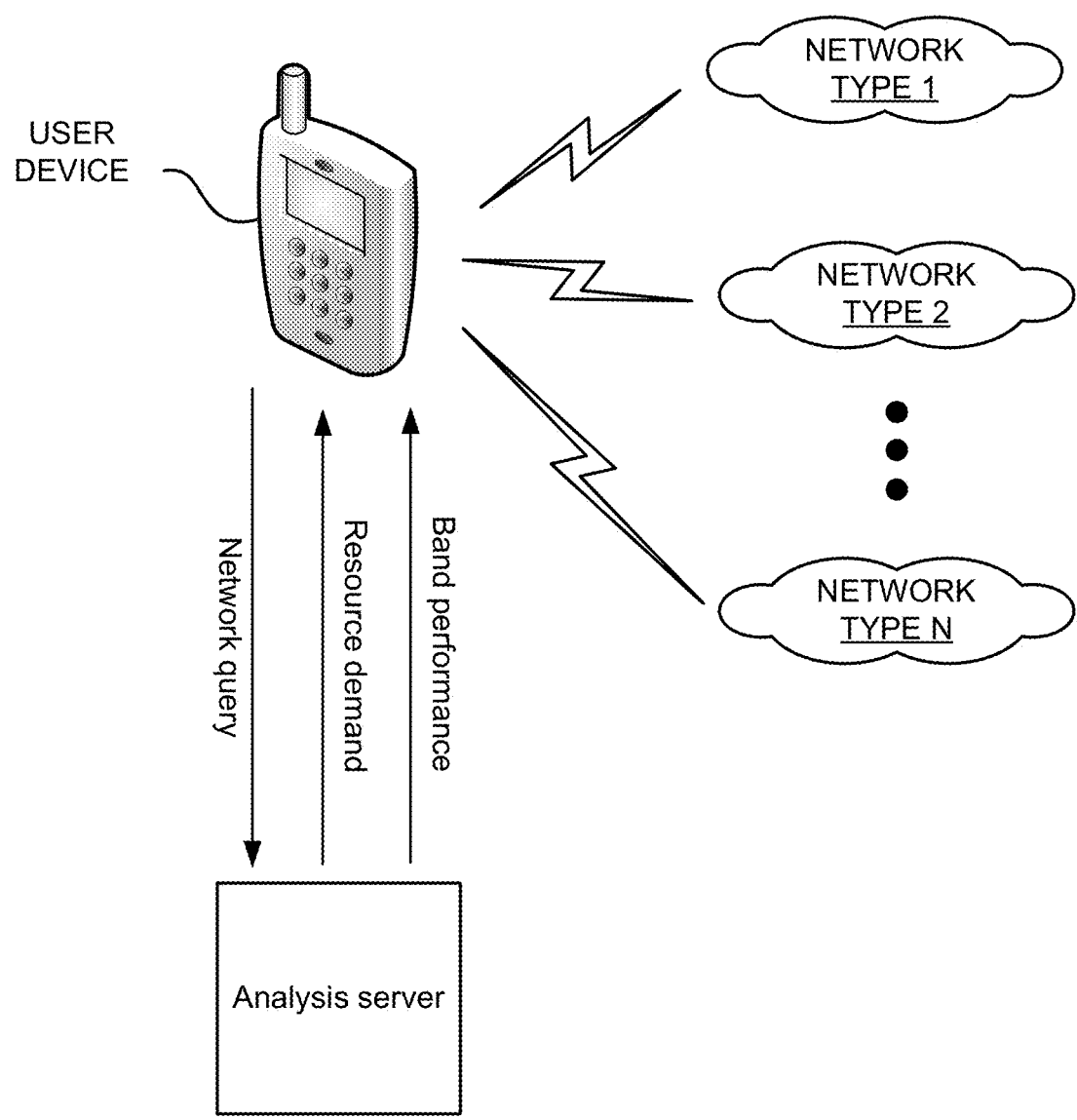
FIG. 1 illustrates an example overview of an implementation described herein.

FIG. 1 illustrates an example overview of an implementation described herein. As shown in FIG. 1, a user device may communicate with an analysis server and may determine one or more networks (e.g., network type 1 through network type N, where N≥1) to connect with (e.g., via one or more wireless bands associated with the networks) based on information received from the analysis server. In some implementations, the user device may provide the analysis server with a network query having information regarding an application selected by a user of the user device (e.g., an application identifier (ID), an application name, and/or some other information regarding an application).

As shown in FIG. 1, the analysis server may provide the user device (e.g., in response to the network query) with information regarding a resource demand associated with the application, and network performance of wireless bands and/or networks associated with the wireless bands.

In some implementations, the user device may determine which networks and/or wireless bands via which to connect based on the resource demand information and based on the network performance information received from the analysis server. As an example, assume that a user, associated with the user device, selects a video streaming application. The user device may send a network query including information regarding the video streaming application to the analysis server. In some implementations, the analysis server may provide (e.g., as a response to the query) information to identify that the video streaming application includes a demand for network resources, such as a demand for greater than 5 megabits per second (mbps) of bandwidth, a latency value of less than 200 milliseconds (ms), and a jitter value of less than 50 ms. The analysis server may also provide wireless band performance information for one or more wireless bands associated with network type 1 through network type N.

In some implementations, the user device may determine wireless bands having the capability to support the demand for network resources of the video streaming applications (e.g., a single wireless band having the network capacity, or multiple wireless bands that, when used together, have the network capacity) based on the wireless band performance information. In some implementations, the user device may connect via the determined wireless band(s) and may connect to respective networks (e.g., network type 1 through type N) when connecting via the determined wireless band(s). In some implementations, the user device may connect via wireless band(s) using radios associated with the respective network type (e.g., a user device may use a WiFi radio to connect to network type 1 associated with a first set of wireless bands and/or may use a 4G cellular radio to connect to network type 2 associated with a second set of wireless bands).

In some implementations, the user device may connect via the determined wireless band(s) such that the application resource demands may be satisfied, thereby improving application performance and improving user experience (e.g., by preventing instances of lag, by minimizing download times, etc.). Further, the user device may dynamically switch wireless bands when a network, associated with a particular wireless band, becomes congested and no longer satisfies the resource demand of the application.

Figure 2:
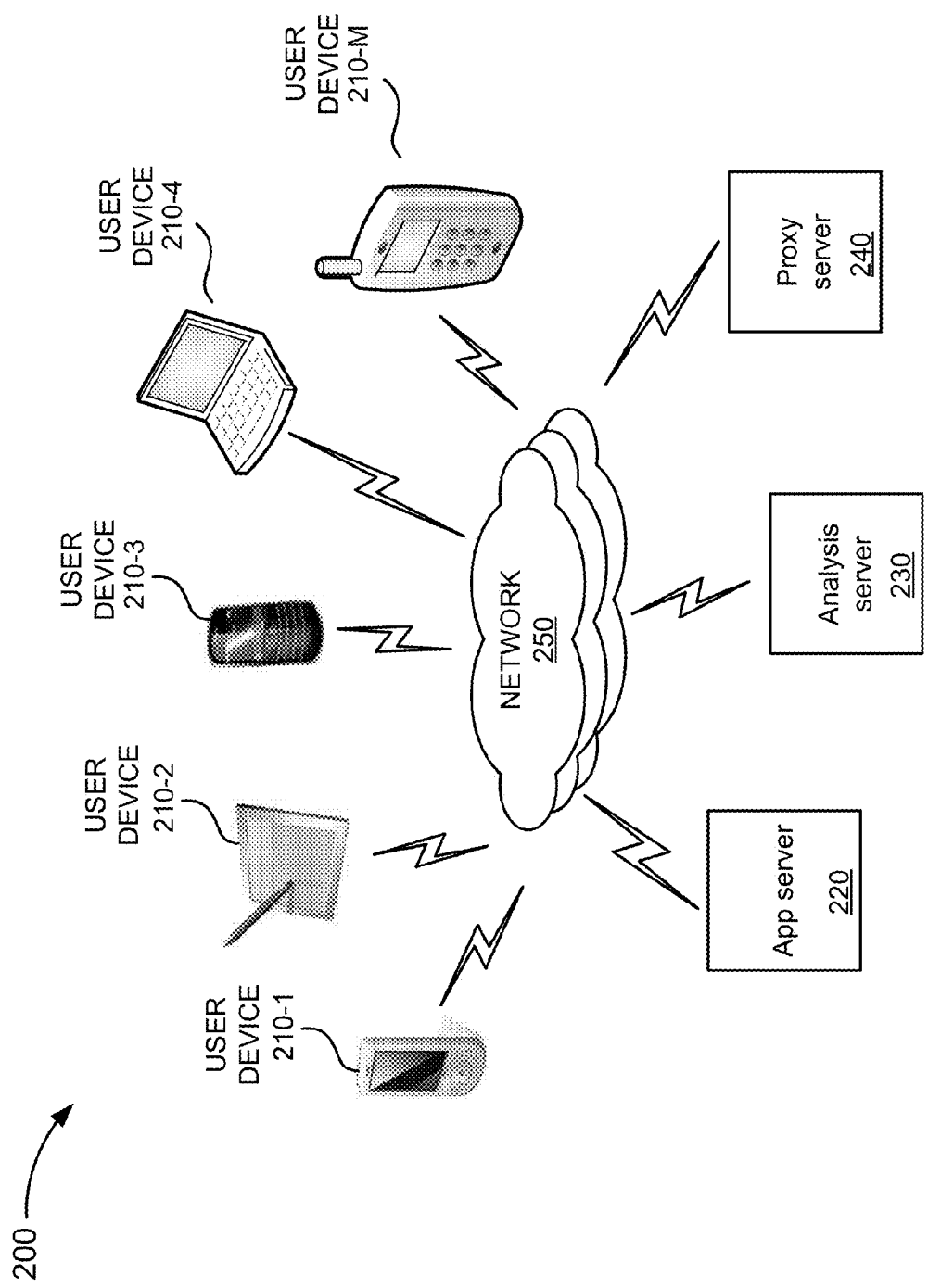
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1 through 210-M, where M≥1, (individually referred to as "user device 210" or collectively referred to as "user devices 210"), application server 220 (referred to as "app server 220"), analysis server 230, proxy server 240, and network 250.

User device 210 may include any portable device capable of communicating via a network, such as a cellular network, or some other network. For example, user device 210 may correspond to a mobile communication device (e.g., a smart phone or a personal digital assistant (PDA)), a portable computer device (e.g., a laptop or a tablet computer), a gaming device, or another type of device. In some implementations, user device 210 may communicate with app server 220 in order to receive data associated with performing a task of an application (e.g., a video streaming application, an audio streaming application, a web browsing application, a gaming application, or some other application). In some implementations, user device 210 may connect to network 250 via multiple network types, multiple wireless bands and/or multiple radios. In some implementations, user device 210 may be assigned an address, such as an internet protocol (IP) address for each network type with which user device 210 connects.

App server 220 may include a computing device, such as a server device or a collection of server devices. In some implementations, app server 220 may communicate with user device 210 to allow user device 210 to perform some task associated with an application of user device 210. For example, app server 220 may provide user device 210 with data relating to a particular application (e.g., a video streaming application, an audio streaming application, a voice communication application, a video conferencing application, or some other application) of user device 210.

Analysis server 230 may include a computing device, such as a server device, or a collection of server devices. In some implementations, analysis server 230 may communicate with user device 210, app server 220, and/or network 250 in order to determine resource demand for specific applications of user device 210. In some implementations, analysis server 230 may determine network performance data (e.g., average bandwidth, average latency, average jitter, etc.) for a wireless band associated with a network (e.g., a network via which user device 210 connects to network 250).

Proxy server 240 may include a computing device, such as a server device or a collection of server devices. In some implementations, proxy server 240 may communicate with user device 210 and/or with network 250 to bind (combine) multiple IP addresses, associated with user device 210, when user device 210 connects with multiple network types (e.g., via multiple wireless bands). Proxy server 240 may bind the multiple IP addresses to form a single IP address to present to app server 220, such that app server 220 may communicate with user device 210 via a single IP address.

Network 250 may include one or more wired and/or wireless networks. For example, network 250 may include a cellular network, a public land mobile network (PLMN), a second generation (2G) network, a third generation (3G) network, a fourth generation (4G) network, a fifth generation (5G) network, and/or another network. Additionally, or alternatively, network 250 may include a local area network (LAN), a wireless LAN (WLAN), such as a WiFi network, a wide area network (WAN), a metropolitan network (MAN), a telephone network (e.g., the Public Switched Telephone Network (PTSSN)), an ad hoc network, a managed IP network, a virtual private network (VPN), an intranet, the Internet, a fiber optic-based network, and/or combination of these or other types of networks. In some implementations, user device 210 may connect with network 250 via a network device (e.g., a router, a wireless access point, a switch, a base station, etc.) having one or more wireless bands relating to one or more radios associated with user device 210 (e.g., a WiFi radio, a cellular radio, etc.).

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
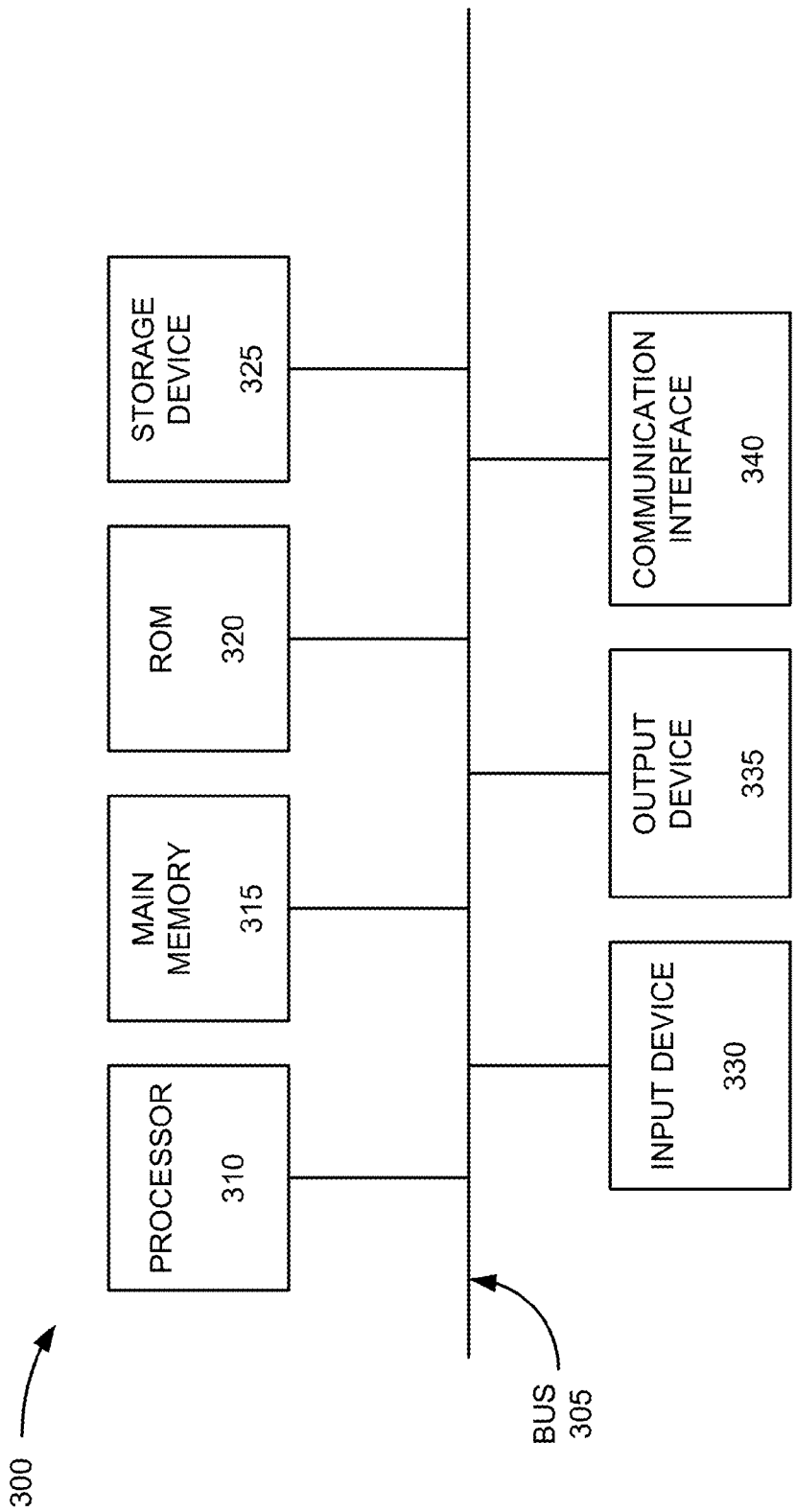
FIG. 3 illustrates example components of a device that may be used within the environment of FIG. 2.

FIG. 3 illustrates example components of a device 300 that may be used within environment 200 of FIG. 2. Device 300 may correspond to user device 210, app server 220, analysis server 230, and proxy server 240. Each of user device 210, app server 220, analysis server 230, and proxy server 240 may include one or more devices 300, and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical storage device or spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components.

FIGS. 4A-4B illustrate example data structures 400 and 410 that may be stored by one or more devices in environment 200, such as analysis server 230. In one implementation, data structures 400 and 410 may be stored in a memory of analysis server 230. In another implementation, data structures 400 and 410 may be stored in a memory separate from, but accessible by analysis server 230. In some implementations, data structures 400 and 410 may be stored by some other device in environment 200, such as app server 220, proxy server 240, or user device 210.

A particular instance of either of data structures 400 or 410 may contain different information and/or fields than another instance of either data structures 400 or 410. In some implementations, data structure 400 may correspond to information associated with resource demands for particular applications. In some implementations, data structure 410 may correspond to information associated with network performance of wireless bands.

As shown in FIG. 4A, data structure 400 may include application information field 401 and resource demand field 402.

In some implementations, application information field 401 may store information to identify individual applications, associated with user device 210, to perform some task. For example, application field 401 may store an application ID (e.g., a string of characters of any length or format) to uniquely identify an application and may also store an application name (e.g., a description of an application). As an example, assume that an application has an application ID of "123" and has an application name of "Streaming video player." As shown in FIG. 4A, an example entry of application field 401 may include the application ID of "123" associated with the application having the application name "Streaming video player."

Resource demand field 402 may store information to identify network resources that a particular application may need to perform a task at a particular level of quality. As an example, assume that a streaming video application (e.g., an application associated with application ID "123") may need greater than 5 megabits per second (mbps) of bandwidth, less than 200 milliseconds (ms) of latency, and less than 50 ms of jitter in order to provide streaming video to user device 210 at a particular video resolution and without lag. As shown in FIG. 4A, an example entry of resource demand field 402 may include information to identify greater than 5 mbps of bandwidth, less than 200 ms of latency, and less than 50 ms of jitter relating to resource demand of the application having the application ID "123."

In some implementations, information stored by resource demand field 402 may be provided by app server 220 and/or by user device 210. For example, app server 220 and/or user device 210 may provide information to identify resource demand for a particular application (e.g., a user, associated with app server 220 and/or user device 210, may provide the information via a user interface associated with app server 220 and/or user device 210). Alternatively, analysis server 230 may determine resource demand for an application based on monitoring network activity associated with the application when user device 210 uses the application to perform some task. In some implementations, information stored by resource demand field 402 may include average values over a period of time or real-time values associated with resource demand for an application based on network activity of the application.

While particular fields are shown in a particular format in data structure 400, in practice, data structure 400 may include additional fields, fewer fields, different fields, or differently arranged fields than are shown in FIG. 4A. For example, resource demand field 402 may include a demand for an encrypted session to indicate that a particular application may need a wireless band capable of connecting to user device 210 for an encrypted session.

As shown in FIG. 4B, data structure 410 may include network ID field 411, coverage area field 412, radio type field 413, wireless band field 414, and band performance field 415.

In some implementations, network ID field 411 may include information to uniquely identify a wireless network having a particular coverage area and associated with a particular radio type and associated with one or more wireless bands. Network ID field 411 may store a string of characters in any format and may correspond to an identifier of a network device used to connect user device 210 with the wireless network. (e.g., a media access control (MAC) address, an IP address, a base station identifier, an access point identifiers, or some other identifier).

Coverage area field 412 may include information to identify a wireless coverage area for a wireless network with which user device 210 may connect when in the wireless coverage area. In some implementations, information stored by coverage area field 412 may include information regarding a geographic radius of coverage and information regarding a geographic center position of the coverage area. For example, assume that the network associated with network ID "4521" has a geographic radius of coverage of 100 meters and further has a geographic center position associated with longitude and latitude coordinates of 37.8, −122.4. Coverage area field 412 may store "100 m." and "37.8, −122.4" to identify the geographic radius of coverage and the geographic center position.

In some implementations, coverage area field 412 may store coverage area information when user device 210 connects with a network and based on a network device type used to connect user device 210 to a network. For example, assume that user device 210 connects with a WiFi-type network device type to connect to the network having the network ID "4521." Further assume that user device 210 connects to the network at a geographic location associated with the longitude and latitude coordinates of 37.8, −122.5. Coverage area field 412 may store the longitude and latitude coordinates of 37.8, −122.5 (e.g., based on information provided by a global positioning system (GPS) of user device 210).

Further, coverage area field 412 may store a radius of coverage based on the network device type and/or based on some other information regarding network coverage. For example, coverage are field 412 may store a particular coverage radius (e.g., 100 meters) when user device 210 connects with a WiFi-type network device and may store some other coverage radius (e.g., 2 kilometers (km)) when user device 210 connects with a cellular-type network device (e.g., a 4G cellular-type network device).

Radio type field 413 may include information to identify a type of radio associated with a particular wireless network and/or a particular wireless band. For example, assume that the network having the network ID "4521" is associated with a WiFi radio type. Radio type field 413 may store the radio type "WiFi" to identify the radio type.

Wireless band field 414 may include information to identify one or more wireless bands associated with a particular wireless network. For example, as described above, a single wireless network may be associated with multiple wireless bands which user device 210 may use to connect to the wireless network via a radio of user device 210. As an example, assume that network ID "4521" uses the wireless bands: 2.4 gigahertz (GHz) industrial, scientific and medical (ISM) and 5.0 GHz unlicensed national information infrastructure (U-NII). Wireless band field 414 may store the information, 2.4 GHz ISM and 5.0 GHz U-NII. In some implementations, wireless band field 414 may store information to identify any type of wireless band having any range of frequencies or band types.

Band performance field 415 may store information to identify network performance by wireless band. In some implementations, band performance field 415 may store network performance information, such as bandwidth, latency, jitter, or some other network performance information. In some implementations, band performance field 415 may store values corresponding to network performance in real-time, or may store average values corresponding network performance over a particular time period. As an example, assume that the bandwidth, latency, and jitter of the wireless band "2.4 GHz ISM" associated with the network ID "4521" is 30 mbps, 200 ms, and 50 ms, respectively. Band performance field 415 may store the values 30 mbps, 200 ms, and 50 ms to indicate the bandwidth, latency, and jitter of the wireless band.

In some implementations, information stored by band performance field 415 may relate to network capacity of a particular wireless band and/or a capability of the wireless band to satisfy a resource demand associated with an application. Continuing with the above example, band performance field 415 may store information to identify that the "2.4 GHz ISM" wireless band has the capacity to support an application with a resource demand of greater than 30 mbps of bandwidth, less than 200 milliseconds (ms) of latency, and less than 50 ms of jitter.

While particular fields are shown in a particular format in data structure 410, in practice, data structure 410 may include additional fields, fewer fields, different fields, or differently arranged fields than are shown in FIG. 4B.

Figure 5:
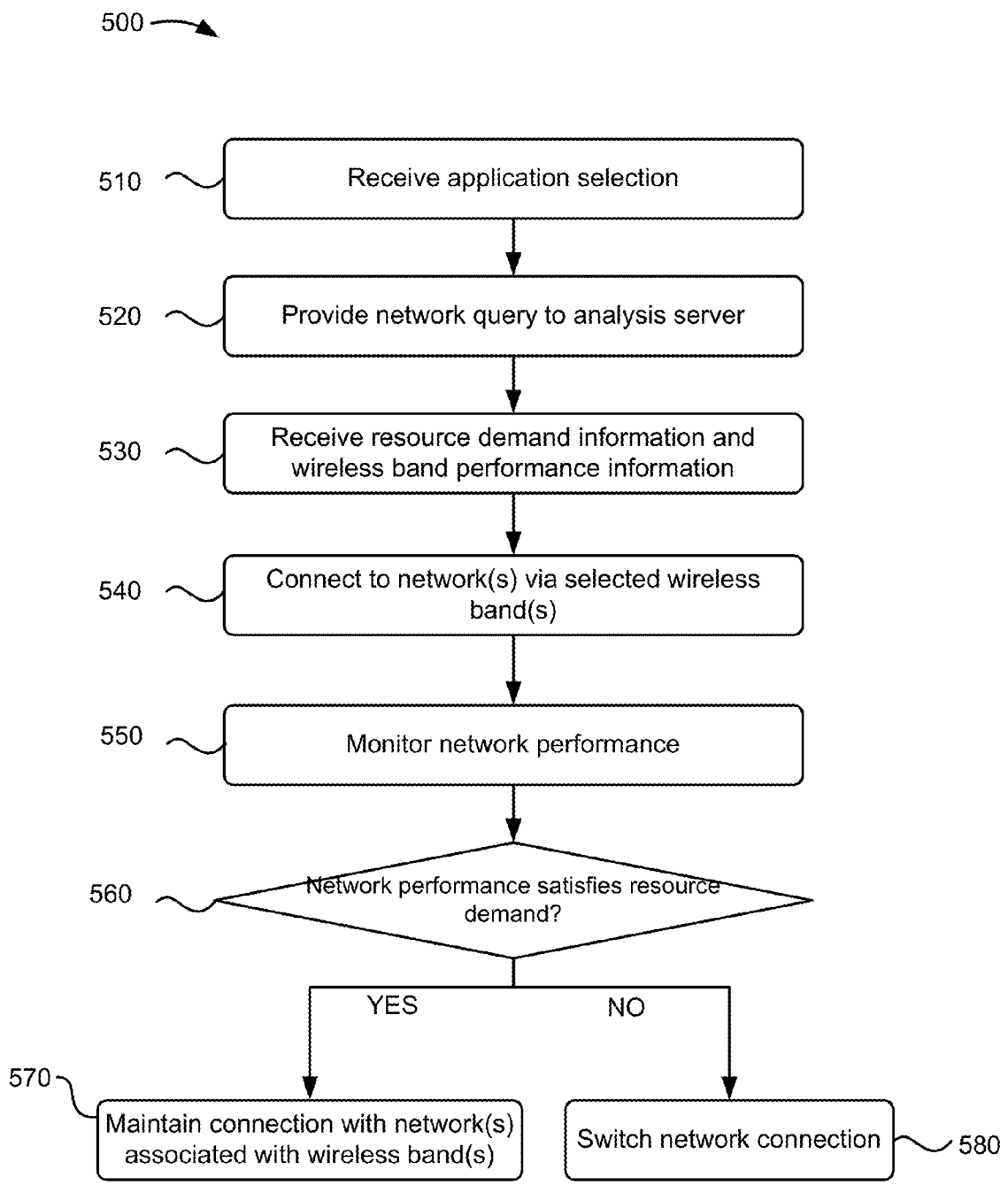
FIG. 5 illustrates a flowchart of an example process for selecting a wireless band.

FIG. 5 illustrates a flowchart of an example process 500 for selecting a wireless band. In one implementation, process 500 may be performed by one or more components of user device 210. In another implementation, some or all of blocks of process 500 may be performed by one or more components of another device in environment 200 (e.g., app server 220, analysis server 230, or proxy server 240), or a group of devices including or excluding user device 210.

As shown in FIG. 5, process 500 may include receiving an application selection (block 510). For example, user device 210 may receive the application selection (e.g., a selection of a particular application, such as a video streaming application, an audio streaming application, a web browsing application, or some other application) from a user, associated with user device 210, via a user interface of user device 210.

Process 500 may also include providing a network query to an analysis server (block 520). For example, user device 210 may generate a network query having information, such as an application identifier associated with the selected application, information regarding radios associated with user device 210, information regarding wireless bands compatible with user device 210, and/or some other network-related information. In some implementations, the network query may further include a request for resource demand information associated with the selected application, and/or a request for wireless band performance information associated with the wireless bands compatible with user device 210. In some implementations, user device 210 may provide the network query to analysis server 230.

As described above, resource demand information may include information to identify network resources that the selected application may need to perform a task at a particular level of quality. Also as described above, resource demand information may be determined by analysis server 230 based on receiving resource demand information and/or based on monitoring network activity and resource demand for an application. In some implementations, the wireless band performance information may relate to network capacity of the wireless band with relation to a capability to support a resource demand of an application.

Process 500 may further include receiving resource demand information and wireless band performance information (block 530). For example, user device 210 may receive resource demand information, associated with the selected application, and wireless band performance information from analysis server 230. In some implementations, user device 210 may receive resource demand information and wireless band performance information as part of a response to the network query provided by user device 210 to analysis server 230.

Process 500 may also include connecting to network(s) via selected wireless band(s) (block 540). For example, user device 210 may select wireless band(s) based on the resource demand information and the wireless band performance information and may connect to network(s) associated with the selected wireless band(s). As an example, assume that the resource demand information identifies a demand for the selected application of greater than 5 mbps, less than 200 ms of latency, and less than 50 ms of jitter for a video streaming application. Further assume that the wireless band performance information identifies that a first wireless band (e.g., a 2.4 GHz ISM wireless band associated with a WiFi network) has a capacity to provide an application with 3 mbps, less than 100 ms of latency, and less than 25 ms of jitter. Further assume that the wireless band performance information identifies that a second wireless band (e.g., a UMTS wireless band associated with a 4G cellular network) has a capacity to provide an application with 10 mbps, less than 300 ms of latency, and less than 75 ms of jitter.

User device 210 may apply an algorithm to determine a wireless band, or a combination of wireless bands, that may satisfy the resource demand associated with the selected application when connected with user device 210. Continuing with the above example, user device 210 may determine that the first wireless band alone may not satisfy the resource demand since the first wireless band has a capacity of 3 mbps of bandwidth, whereas the resource demand includes a demand for 5 mbps of bandwidth. Further, user device 210 may determine that the second wireless band alone may not satisfy the resource demand since the second wireless band has a capacity of 300 ms of latency and 75 ms of jitter, whereas the resource demand includes a demand for less than 100 ms of latency and less than 50 ms of jitter. In some implementations, user device 210 may determine that the first wireless band and the second wireless band, when used together, may satisfy the resource demand (e.g., using band aggregation). User device 210 may connect via the wireless band(s) based on determining the wireless bands that may satisfy the resource demand.

In some implementations, user device 210 may connect with a network associated with a wireless band via a radio of user device 210. For example, user device 210 may connect with a WiFi network associated with a 2.4 GHz WiFi-type wireless band via a WiFi radio of user device 210. Additionally, or alternatively, user device 210 may connect with a 4G cellular network associated with a UMTS wireless band via a 4G radio of user device 210. Additionally, or alternatively, user device 210 may connect with some other network associated with another wireless band via some other radio of user device 210.

In some implementations, user device 210 may connect via a wireless band based on wireless coverage information stored by data structure 410 (e.g., in addition to, or alternatively from, resource demand information and/or wireless band performance information). For example, as described above, user device 210 may receive wireless coverage information from analysis server 230 as part of a response to the network query. As an example, assume that user device 210 receives wireless coverage information to indicate that the wireless coverage area of a network for a particular wireless band is a 2 km radius with a center position corresponding to longitude and latitude coordinates of 37.2, −120.2. Further assume that user device 210 is located within the wireless coverage area of the network for the particular wireless band. User device 210 may connect via the wireless band based on determining that user device 210 is within the wireless coverage of the network associated with the wireless band.

In some implementations, user device 210 may be assigned an IP address when connecting with a network. As an example, assume that user device 210 connects with a first network (e.g., a WiFi network) associated with a 2.4 GHz WiFi-type wireless band and with a second network (e.g., a 4G cellular network) associated with a UMTS wireless band. User device 210 may be assigned two IP addresses (e.g., a first IP address associated with the first network and a second IP address associated with the second network). In some implementations, proxy server 240 may bind the first and second IP addresses to form a third IP address (e.g., a single IP address associated with the first network and the second network) such that user device 210 may communicate with app server 220 (e.g., via proxy server 240) using a single IP address in order to perform a task associated with the selected application.

Process 500 may further include monitoring network performance (block 550). For example, user device 210 may monitor network performance associated with a connection between user device 210 and a network associated with the wireless band(s). In some implementations, user device 210 may determine network transfer speed (e.g., a speed relating to network bandwidth), network latency, network jitter, and/or some other network performance information. For example, user device 210 may determine network transfer speed based on identifying an amount of data transferred (e.g., data transferred to and/or from user device 210 when performing a task associated with the selected application) over a particular time period (e.g., 100 mb of data transferred over 10 seconds would correspond to a 10 mbps network transfer speed). In some implementations, user device 210 may monitor the network performance continuously or periodically and may update network performance information at regular intervals (e.g., 1 second intervals, 5 second intervals, 15 second intervals, or some other interval).

Process 500 may also include determining whether the network performance satisfies the resource demand (block 560). For example, user device 210 may determine whether the network performance, associated with the connection between user device 210 and with the network associated with the wireless band(s), satisfies the resource demand based on monitoring the network performance as described above. For example, assume that the resource demand includes a demand for greater than 5 mbps, less than 200 ms of latency, and less than 50 ms of jitter. Further assume that the network performance identifies a bandwidth of 10 mbps, 100 ms of latency, and 25 ms of jitter. Given the above assumptions, user device 210 may determine that the network performance satisfies the resource demand.

If the network performance satisfies the resource demand (block 560-YES), process 500 may further include maintaining connection with the network(s) associated with the wireless band(s) (block 570). For example, user device 210 may maintain the connection by initiating a "keep-alive" function with the connected networks associated with the wireless band(s) (e.g., a function to prevent user device 210 from disconnecting from the network(s) associated with the wireless band(s) by causing network activity between user device 210 and the connected network(s) associated with the wireless band(s)).

If, on the other hand, the network performance does not satisfy the resource demand (block 560-NO), process 500 may also include switching the network connection (block 580). For example, assume that user device 210 connects with a first network via a first wireless band (e.g., wireless band associated with a WiFi network) in accordance with block 540 as described above. User device 210 may disconnect with the first network and connect to a second network via a second wireless band (e.g., a wireless band associated with a 4G cellular network), based on determining that the network performance relating to the connection between user device 210 and the first network does not satisfy the resource demand. In some implementations, user device 210 may prioritize a list of wireless bands with which to connect via an associated networks based on the wireless band performance information received from analysis server 230 (e.g., in accordance with block 530). For example, networks associated with wireless bands having higher capacity may be prioritized over networks associated with wireless bands having lower capacity.

While a particular series of blocks has been described above with regards to FIG. 5, the blocks and/or the order of the blocks may be modified in other implementations. Further, non-dependent blocks may be performed in parallel.

Figure 6:
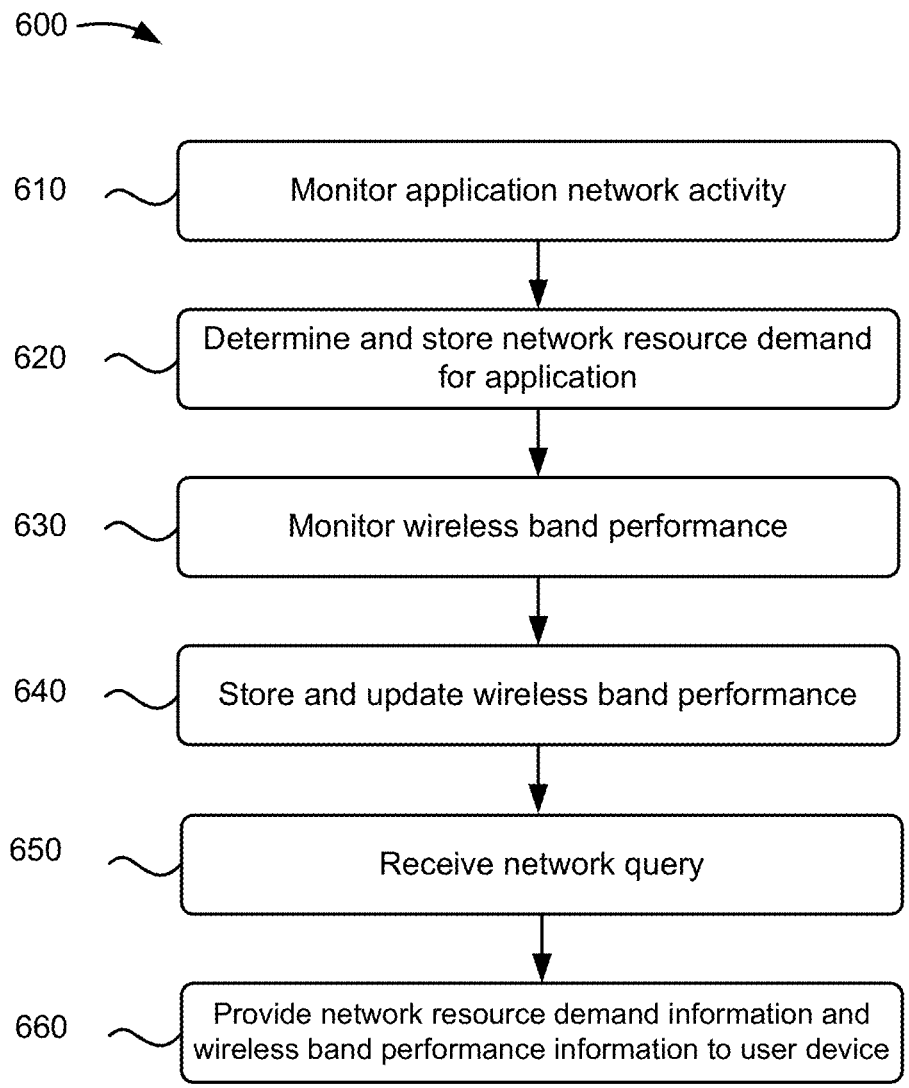
FIG. 6 illustrates a flowchart of an example process for providing information, regarding resource demand and information regarding network band capacity, to a user device.

FIG. 6 illustrates a flowchart of an example process 600 for providing information regarding resource demand and information regarding network band capacity to user device 210. In one implementation, process 600 may be performed by one or more components of analysis server 230. In another implementation, some or all of blocks of process 600 may be performed by one or more components of another device in environment 200 (e.g., user device 210, app server 220 or proxy server 240), or a group of devices including or excluding analysis server 230.

As shown in FIG. 6, process 600 may include monitoring application network activity (block 610). For example, analysis server 230 may receive an indication from user device 210 and/or app server 220 when user device 210 receives selection of a particular application. In some implementations, analysis server 230 may monitor network activity associated with the particular application. For example, assume that the particular application is a video streaming application. Analysis server 230 may identify network bandwidth, network latency, network jitter, and/or some other network-related information associated with network activity of the video streaming application while the video streaming application is in operation (e.g., providing data relating to a video streaming service to user device 210). In some implementations, analysis server 230 may identify instances of lag, or some other instance relating to a performance parameter of the application.

Process 600 may also include determining and storing resource demand for the application (block 620). For example, analysis server 230 may determine resource demand for the application based on monitoring the network activity for the application as described above. For example, assume that a video streaming application operates with 1 mbps of bandwidth, 200 ms of latency, and 50 ms of jitter (e.g., the network activity of the application corresponds to 1 mbps of bandwidth, 200 ms of latency, and 50 ms of jitter). Further assume that the video streaming application experiences lag or some other performance issue when operating at 1 mbps of bandwidth, 200 ms of latency, and 50 ms of jitter. Analysis server 230 may determine a cause for the performance issues, and may determine resource demand that may correct the performance issue. For example, analysis server 230 may determine that the performance issue (e.g., lag) may be corrected when the application operates at 5 mbps of bandwidth, 200 ms of latency, and 50 ms of jitter.

In some implementations, analysis server 230 may determine the resource demand to correct the performance issue based on a threshold associated with a performance parameter, such as a threshold relating to network bandwidth or a threshold relating to a risk of lag. Continuing with the above example, assume that the threshold relating to network bandwidth was not satisfied by a factor of five when the network bandwidth corresponding to the network activity of the application was 1 mbps. As such, analysis server 230 may determine a resource demand of 5 mbps of bandwidth (e.g., the operating network bandwidth multiplied by the factor of 5), as described above.

In another example, assume that the video streaming application operates with 50 mbps of bandwidth, 100 ms of latency, and 25 ms of jitter (e.g., the network activity of the application corresponds to 50 mbps of bandwidth, 100 ms of latency, and 25 ms of jitter) and that the video streaming application does not experience any performance issues. Analysis server 230 may determine a resource demand of less than the operating bandwidth, latency, and jitter when the streaming video application satisfies a performance threshold relating to a desirable operating performance. For example, analysis server 230 may determine that the video streaming application completed a download of a video file at a factor of 10 times faster than the performance threshold. As such, analysis server 230 may determine a resource demand of 5 mbps of bandwidth (e.g., the operating bandwidth of 50 mbps divided by the factor of 10). Similarly, analysis server 230 may determine that a threshold relating to a risk of lag was satisfied by a factor of two for the streaming video application. As such, analysis server 230 may determine a resource demand of 200 ms of latency, and 50 ms of jitter (e.g., the operating bandwidth of 100 ms of latency and 25 ms of jitter multiplied by 2).

In some implementations, analysis server 230 may determine a resource demand based on receiving information regarding the resource demand from user device 210 and/or app server 220. For example, a user of user device 210 or app server 220 may provide user device 210 or app server 220 with a resource demand for an application via a user interface of user device 210 or app server 220.

In some implementations, and as described above, information regarding resource demand may be stored by data structure 400.

Process 600 may further include monitoring wireless band performance (block 630). For example, analysis server 230 may monitor network activity associated with a wireless band when user device 210 connects to a network associated with the wireless band. In some implementations, analysis server 230 may monitor network performance, such as bandwidth, latency, jitter, and/or some other information regarding network performance at intervals (e.g., 1 second, 5 second, 15 second, 30 second or some other interval) by tracking network activity between user device 210 and the network associated with the wireless band when user device 210 connects to the network via the wireless band to perform some task via an application of user device 210.

In some implementations, and as described above, user device 210 may connect to one or more network(s) via multiple wireless bands when performing a task via an application. Proxy server 240 may identify network activity associated with each of the wireless bands and provide the network activity by wireless band to analysis server 230.

Process 600 may also include storing and updating wireless band performance (block 640). For example, analysis server 230 may store wireless band performance information by wireless band type, network type, and/or radio type in data structure 410 as described above. In some implementations, analysis server 230 may update information stored by band performance field 415 at intervals (e.g., 1 second, 5 second, 15 second, 30 second or some other interval) based on monitoring and/or determining information regarding wireless band performance at the intervals.

Process 600 may further include receiving a network query (block 650). For example, analysis server 230 may receive the network query from user device 210. As described above, the network query may include an application ID, an application name, a request for resource demand information for the application, and/or a request for wireless band performance for wireless bands compatible with user device 210.

Process 600 may also include providing resource demand information and wireless band performance information to the user device (block 660). For example, analysis server 230 may determine the resource demand information for the application ID associated with the network query based on information stored by data structure 400. Additionally, analysis server 230 may determine wireless band performance information based on information stored by data structure 410. In some implementations, analysis server 230 may provide the resource demand information and the wireless band performance information to user device 210 as a response to the network query received from user device 210.

While a particular series of blocks has been described above with regards to FIG. 6, the blocks and/or the order of the blocks may be modified in other implementations. Further, non-dependent blocks may be performed in parallel. For example, blocks 610-620 may performed independently of blocks 630-660. Further, blocks 630-640 may be performed independently of blocks 610-620 and blocks 650-660. Also, blocks 650-660 may be performed independently of blocks 610-640.

Figure 7:
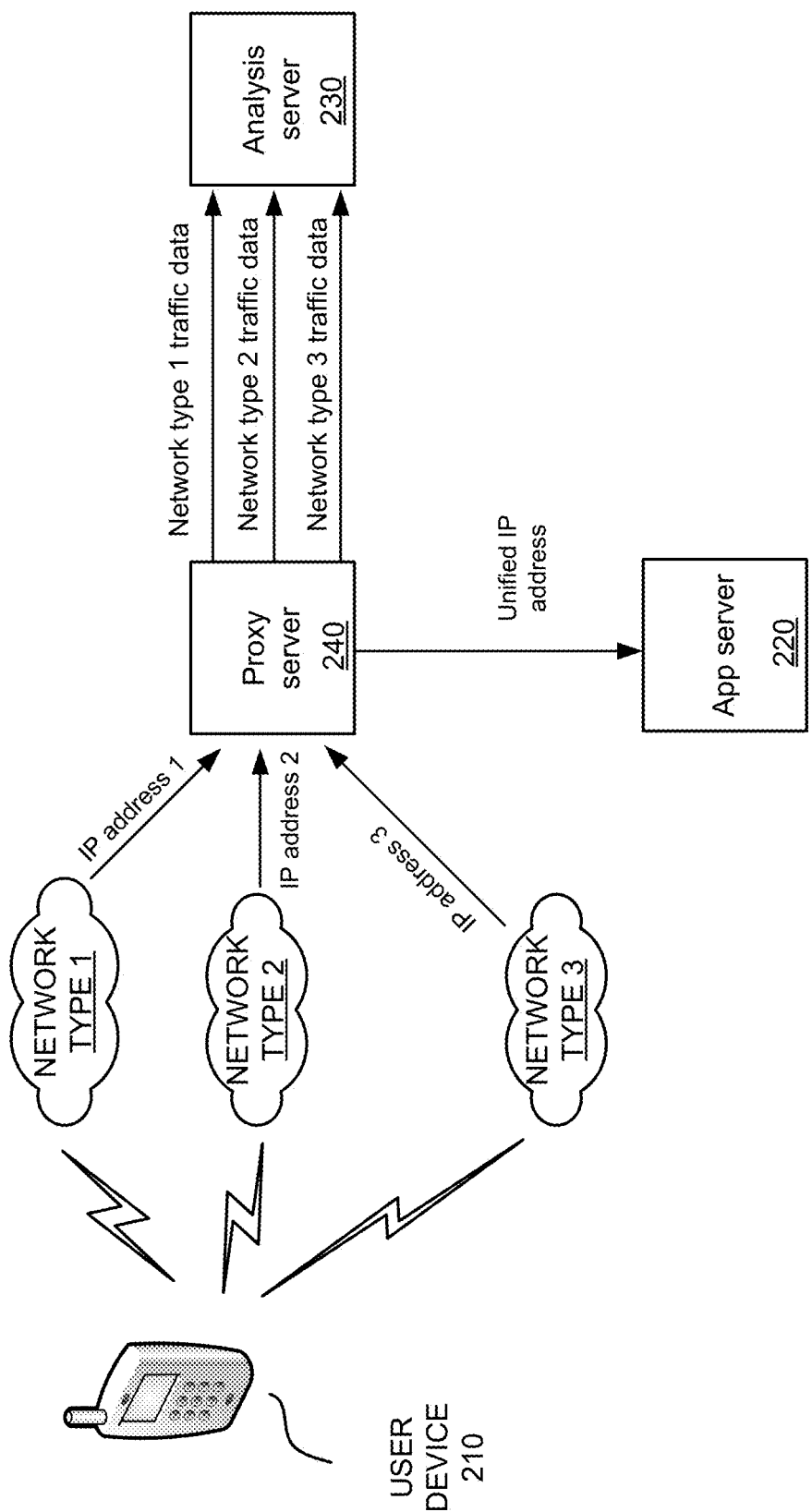
FIG. 7 illustrates an example implementation of functions performed by a proxy server.

FIG. 7 illustrates an example implementation of IP binding functions performed by proxy server 240. In FIG. 7, assume that user device 210 connects with three networks (e.g., network type 1, network type 2, and network type 3) via multiple bands in accordance with process 500. As shown in FIG. 7, user device 210 may communicate with proxy server 240 via three unique IP addresses assigned by network type 1, network type 2, and network type 3, respectively. Proxy server 240 may generate a fourth IP address (e.g., a unified IP address) such that user device 210 may communicate with app server 220 using only the unified IP address.

In some implementations, user device 210 may communicate with app server 220 using the unified IP address to send and/or receive data associated with performing a task via an application of user device 210 (e.g., send and/or receive data associated with a video streaming application, or some other application). In some implementations, the unified IP address may prevent communication problems between user device 210 and app server 220 (e.g., dropped connections, data packet loss, etc.) in relation to when user device 210 communicates with app server 220 using multiple different IP addresses.

As further shown in FIG. 7, proxy server 240 may identify network traffic being sent to and/or received by individual networks (e.g., network type 1, network type 2, and network type 3) and by wireless band via the respective IP addresses associated with the network traffic. In some implementations, proxy server 240 may provide network traffic information to analysis server 230 by network type and/or by wireless band type in accordance with block 630 (FIG. 6). As described above, information stored by band performance field 415 (FIG. 4B) may be based on information received by proxy server 240 relating to network traffic by wireless band type.

While a particular example is shown in FIG. 7, it will be apparent that the above description is merely an example implementation. For example, while only three network types are discussed with respect to FIG. 7, it will be apparent that proxy server 240 may bind any number of IP addresses associated with any number of networks, and proxy server 240 may provide network traffic information to analysis server 230 for any number of networks and/or any number of wireless bands associated with the networks.

As described above, user device 210 may determine a wireless band based on the capability of the wireless band, and/or an associated network or radio of the wireless band, to satisfy a resource demand associated with a particular application of user device 210 (e.g., an application selected by a user of user device 210). Additionally, or alternatively, user device 210 may determine a wireless band based on a coverage area of a network associated with the wireless band and the geographic position of user device 210 in relation to the coverage area of the network associated with the wireless band. In some implementations, user device 210 may connect with multiple networks via multiple wireless bands (e.g., using band aggregation) in order to satisfy the resource demand. Additionally, user device 210 may switch networks via switching wireless bands when the connected networks do not satisfy the resource demand, thereby preventing instances of lag, slow application data transmission speeds, and/or some other performance issue.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a user device, a selection of an application associated with the user device;
   generating, by the user device, a query based on receiving the selection of the application,
      the query including:
         an identifier associated with the application,
         a request for information regarding a resource demand of the application, and
         a request for information regarding a performance of a plurality of wireless bands relating to a capability of the plurality of wireless bands to satisfy the resource demand,
            each wireless band, of the plurality of wireless bands, being associated with a respective network;
   providing, by the user device, the query to a first server;
   receiving, by the user device and from the first server, a response to the query,
      the response including the information regarding the resource demand and the information regarding the performance of the plurality of wireless bands;
   determining, by the user device, a combination of wireless bands, of the plurality of wireless bands, that satisfy the resource demand,
      each wireless band, of the combination of wireless bands, being associated with a respective first internet protocol (IP) address;
   connecting, by the user device, with a first network via the combination of wireless bands; and
   communicating, by the user device, with a second server, via the first network, to operate the application in accordance with the resource demand,
      the user device communicating with the second server via a third server,
      the third server combining the respective first IP address associated with each wireless band, of the combination of wireless bands, to form a second IP address, and
      the user device communicating with the second server using the second IP address.

2. The method of claim 1, further comprising:
   determining whether a network performance, of the combination of wireless bands, satisfies the resource demand;
   disconnecting from the first network when the network performance does not satisfy the resource demand;
   connecting to a second network via one or more second wireless bands, of the plurality of wireless bands based, on disconnecting with the first network; and
   communicating with the second server using the second network.

3. The method of claim 2, further comprising:
   performing a network function to prevent the user device from disconnecting from the first network when the network performance satisfies the resource demand.

4. The method of claim 1, where determining the combination of wireless bands is further based on a geographic connection area of the first network and based on a geographic location of the user device in relation to the geographic connection area.

5. The method of claim 1, where the combination of wireless bands are associated with one or more of a cellular network or a wireless fidelity (WiFi) network.

6. A device comprising:
one or more memories; and
one or more processors, connected to the one or more memories, to:
receive a selection of an application associated with the user device;
generate a query based on receiving the selection of the application,
the query including:
an identifier, associated with the application,
a request for information regarding a resource demand of the application, and
a request for information regarding a performance of a plurality of wireless bands relating to a capability of the plurality of wireless bands to satisfy the resource demand,
each wireless band, of the plurality of wireless bands, being associated with a respective network;
provide the query to a first server;
receive, from the first server, a response to the query,
the response including the information regarding the resource demand and the information regarding the performance of the plurality of wireless bands;
determine a combination of wireless bands, of the plurality of wireless bands, that satisfy the resource demand;
connect with a first network via the combination of wireless bands,
each wireless band, of the combination of wireless bands, being associated with a respective first internet protocol (IP) address; and
communicate with a second server, via a third server, using the first network to operate the application in accordance with the resource demand,
the third server combining the respective first IP address associated with each wireless band to form a second IP address,
the third server transmitting communications associated with the user device to the second server using the second IP address.

7. The device of claim 6, where the one or more processors are further to:
determine whether network performance, of the combination of wireless bands, satisfies the resource demand;
disconnect from the first network when the network performance does not satisfy the resource demand;
connect to a second network via one or more second wireless bands, of the plurality of wireless bands, based on disconnecting from the first network; and
communicate with the second server using the second network.

8. The device of claim 7, where the one or more processors are further to:
perform a network function to prevent the user device from disconnecting from the first network when the network performance satisfies the resource demand.

9. The device of claim 6, where the one or more processors, when determining the combination of wireless bands, are further to:
determine the combination of wireless bands further based on a geographic connection area of the first network and based on a geographic location of the user device in relation to the geographic connection area.

10. The device of claim 6, where a first wireless band, of the combination of wireless bands, is associated with a cellular network, and
where a second wireless band, of the combination of wireless bands, is associated with a wireless fidelity (WiFi) network.

11. A non-transitory computer-readable medium storing instructions, the instructions comprising:
one or more instructions which, when executed by one or more processors associated with a user device, cause the one or more processors to:
receive a selection of an application associated with the user device;
generate a query based on receiving the selection of the application,
the query including:
an identifier, associated with the application,
a request for information regarding a resource demand of the application, and
a request for information regarding a performance of a plurality of wireless bands relating to a capability of the plurality of wireless bands to satisfy the resource demand,
each wireless band, of the plurality of wireless bands, being associated with a respective network;
provide the query to a first server;
receive, from the first server, a response to the query,
the response including the information regarding the resource demand and the information regarding the performance of the plurality of wireless bands;
determine a combination of wireless bands, of the plurality of wireless bands, that satisfy the resource demand,
each wireless band, of the combination of wireless bands, being associated with a respective first internet protocol (IP) address;
connect with a first network via the combination of wireless bands; and
communicate with a second server, via a third server, using the first network to operate the application in accordance with the resource demand,
the third server combining the respective first IP addresses to form a second IP address, and
the third server relaying communications between the user device and the second server using the second IP address.

12. The non-transitory computer-readable medium of claim 11, where the instructions further comprise:
one or more instructions which, when executed by the one or more processors, cause the one or more processors to:
determine whether a network performance, of the combination of wireless bands, satisfies the resource demand;
disconnect from the first network when the network performance does not satisfy the resource demand;
connect to a second network via one or more second wireless bands, of the plurality of wireless bands, based on disconnecting from the first network; and communicate with the second server using the second network.

13. The non-transitory computer-readable medium of claim 12, where the instructions further comprise:
one or more instructions which, when executed by the one or more processors, cause the one or more processors to:
perform a network function to prevent the user device from disconnecting from the first network when the network performance satisfies the resource demand.

14. The non-transitory computer-readable medium of claim 11, where the one or more instructions to determine the combination of wireless bands further cause the one or more processors to:
determine the combination of wireless bands further based on a geographic connection area of the first network and based on a geographic location of the user device in relation to the geographic connection area.

15. The non-transitory computer-readable medium of claim 11, where a first wireless band, of the combination of wireless bands, is associated with a cellular network, and
where a second wireless band, of the combination of wireless bands, is associated with a wireless fidelity (WiFi) network.

16. A method comprising:
receiving, by a first server, a selection of an application from a user device,
the user device connecting to a network to operate the application;
monitoring, by the first server, network activity associated with the operation of the application by the user device;
determining, by the first server, a resource demand associated with the application based on the network activity associated with the application;
storing, by the first server, information identifying the resource demand;
monitoring, by the first server, network activity associated with a network connected to the user device via a plurality of wireless bands;
determining, by the first server, respective performance indications for each wireless band, of the plurality of wireless bands, based on the network activity associated with the plurality of wireless bands,
each of the respective performance indications relating to a capability of the wireless band to satisfy the resource demand;
storing, by the first server, the respective performance indications;
receiving, by the first server and from the user device, a query,
the query including an identifier associated with the application, a request for information regarding resource demand of the application, and a request for information regarding the respective performance indications;
providing, by the first server and to the user device, the information regarding the resource demand and the information regarding the respective performance indications based on receiving the query;
communicating, by a second server, with the user device using a combination of wireless bands of the plurality of wireless bands,
the combination of wireless bands being selected based on the information regarding the resource demand and the information regarding the respective performance indications provided to the user device,
each wireless band, of the combination of wireless bands, being associated with a respective first internet protocol (IP) address;
combining, by the second server, the respective first IP address associated with each wireless band, of the combination of wireless bands, to form a second IP address; and
transmitting, by the second server, communications associated with the user device to a third server using the second IP address,
the communications being used to operate the application in accordance with the resource demand.

17. The method of claim 16, where determining the resource demand is further based on a threshold associated with a performance indication relating to the operation of the application.

18. The method of claim 16 further comprising:
receiving, by the first server, information regarding a network activity for each wireless band, of the plurality of wireless bands, from the second server,
the second server identifying the network activity associated with each wireless band, of the plurality of wireless bands, based on respective IP addresses associated with each wireless band.

19. The method of claim 1, where the second IP address is associated with a plurality of networks.

20. The non-transitory computer-readable medium of claim 11, where the second IP address is associated with a plurality of networks.

* * * * *